(12) United States Patent
Sun

(10) Patent No.: US 12,128,940 B2
(45) Date of Patent: Oct. 29, 2024

(54) CART CAPABLE OF BEING HORIZONTALLY FOLDED WITHOUT INCREASING HEIGHT

(71) Applicant: Zhejiang Pride Leisure Products Co,. Ltd., Jinhua (CN)

(72) Inventor: Benlong Sun, Jinhua (CN)

(73) Assignee: ZHEJIANG PRIDE LEISURE PRODUCTS CO., LTD., Zhejiang Province (CN)

( * ) Notice: Subject to any disclaimer, the term of this patent is extended or adjusted under 35 U.S.C. 154(b) by 0 days.

(21) Appl. No.: 18/506,181

(22) Filed: Nov. 10, 2023

(65) Prior Publication Data
US 2024/0157992 A1 May 16, 2024

(30) Foreign Application Priority Data

Nov. 11, 2022 (CN) .......................... 202223005982.2

(51) Int. Cl.
*B62B 3/02* (2006.01)
*B62B 5/06* (2006.01)

(52) U.S. Cl.
CPC .............. *B62B 3/025* (2013.01); *B62B 5/067* (2013.01)

(58) Field of Classification Search
CPC ................................ B62B 3/007; B62B 3/025
See application file for complete search history.

(56) References Cited

U.S. PATENT DOCUMENTS

| | | | | |
|---|---|---|---|---|
| 10,099,711 B1 * | 10/2018 | Sun | ........................ | B62B 3/007 |
| 10,099,712 B1 * | 10/2018 | Sun | ........................ | B62B 5/067 |
| 10,501,103 B1 * | 12/2019 | Wang | ....................... | B62B 3/007 |
| 10,633,010 B1 * | 4/2020 | Zhang | ...................... | B62B 3/025 |
| 10,953,903 B1 * | 3/2021 | Park | ........................ | B62B 3/007 |
| 10,988,153 B1 * | 4/2021 | Horowitz | ............... | B62B 7/008 |
| 11,225,277 B1 * | 1/2022 | Sun | ........................ | B62B 5/061 |
| 11,285,983 B1 * | 3/2022 | Horowitz | ................. | B62B 3/02 |
| 11,332,178 B2 * | 5/2022 | Yang | ....................... | B62B 5/067 |
| 11,518,423 B2 * | 12/2022 | Zhang | ..................... | B62B 3/025 |
| 11,685,416 B2 * | 6/2023 | Yang | ...................... | B62B 3/025 |
| | | | | 280/651 |
| 2018/0327011 A1 * | 11/2018 | Horowitz | ............... | B62B 3/025 |
| 2020/0207392 A1 * | 7/2020 | Wang | ..................... | B62B 3/001 |
| 2020/0283046 A1 * | 9/2020 | Wu | ......................... | B62B 3/007 |
| 2021/0039696 A1 * | 2/2021 | Tong | ........................ | B62B 3/02 |
| 2021/0107548 A1 * | 4/2021 | Wang | ..................... | B62B 3/007 |
| 2021/0107549 A1 * | 4/2021 | Wang | ..................... | B62B 3/007 |
| 2021/0114643 A1 * | 4/2021 | Sun | ......................... | B62B 5/067 |
| 2021/0284216 A1 * | 9/2021 | Sun | ......................... | B62B 5/067 |
| 2021/0291886 A1 * | 9/2021 | Zehfuss | .................. | B62B 9/14 |
| 2021/0300450 A1 * | 9/2021 | Yang | ....................... | B62B 3/025 |
| 2022/0041199 A1 * | 2/2022 | Tong | ....................... | B62B 3/025 |

* cited by examiner

*Primary Examiner* — Katy M Ebner

(74) *Attorney, Agent, or Firm* — WPAT LAW, P.C.; Anthony King

(57) ABSTRACT

A cart capable of being horizontally folded without increasing the height having a frame composed of a front wall, a back wall and two symmetric side walls, a chassis disposed at the bottom of the frame, and four wheel assemblies disposed on two sides of the front wall and two sides of the back wall respectively, wherein the front wall comprises an n-shaped support, a lower horizontal tube and two sliding blocks, the lower horizontal tube is fixed to two symmetric ends of the n-shaped support, the sliding blocks are disposed along two vertical tubes of the n-shaped support and are able to slide upwards and downwards; the back wall is identical in structure with the front wall.

10 Claims, 8 Drawing Sheets

CART CAPABLE OF BEING HORIZONTALLY FOLDED WITHOUT INCREASING HEIGHT

BACKGROUND OF THE INVENTION

1. Technical Field

The invention belongs to the technical field of carts, and particularly relates to a cart capable of being horizontally folded without increasing the height.

2. Description of Related Art

Carts, as transfer vehicles pushed and pulled manually, are used to transfer light articles within a short distance conveniently in places where motor vehicles are inapplicable. Traditional carts used for carrying articles are formed by a carrying platform (such as a flat plate or a hopper), four wheels disposed at the bottom of the carrying platform, and a handle disposed on the back of the carrying platform, wherein the carrying platform is installed on a frame, and the handle, the frame and the carrying platform are generally fixedly assembled by welding or through screws and nuts. Such carts cannot be folded, thus occupying much space when packaged to be transported, used or stored; and the production process and the assembly process of these carts are complex, and users cannot carry these carts easily when going out.

As for other carts, Chinese Patent Publication No. CN205469183U discloses a fixing structure of a foldable cart. The foldable cart comprises a cart frame and multiple wheels disposed at the bottom of the cart frame, wherein the cart frame comprises two frame bodies which are symmetrically arranged front and back, and a middle support frame disposed between the two frame bodies, the middle support frame comprises two I-shaped bars and a horizontal connecting bar used for connecting the two I-shaped bars; each I-shaped bar is provided with an upper short bar, a lower short bar and a vertical bar used for connecting the upper short bar and the lower short bar, and the upper short bar is longer than the lower short bar; horizontal bars of the two frame bodies of the cart frame are pivoted to the upper short bars and lower short bars of the I-shaped bars respectively, the horizontal bars, pivoted to the lower short bars of the I-shaped bars, of the frame bodies are connected to the I-shaped bars through pivot members, each pivot member has one end fixed to the corresponding horizontal bar of one frame body and the other end pivoted to the lower short bar of the corresponding I-shaped bar, a slot is formed in a side, facing the corresponding lower short bar, of each pivot member, and bolts matched with the slots are disposed on two sides of the short bars of at least one I-shaped bar; when the bolts are disposed in the slots, the two frame bodies can be fixed in an unfolded state; and when the bolts disengage from the slots, the two frame bodies can be folded along the pivot points of the pivot members. Compared with traditional non-foldable carts, the carts can be folded through the fixing structure when not used, and the space occupied by the cart is reduced. However, compared with the height of the cart in use, the height of the foldable cart in the vertical direction is increased after the cart is folded, and the cart cannot be stored easily if it is excessively high in the folded state.

BRIEF SUMMARY OF THE INVENTION

In view of the detects of the prior art, the objective of the invention is to provide a cart capable of being horizontally folded without increasing the height, which has a simple structure, can be horizontally folded rapidly without increasing the height, and occupies less space when not used.

To fulfill the above objective, the invention adopts the following technical solution: a cart capable of being horizontally folded without increasing the height comprises a frame composed of a front wall, a back wall and two symmetric side walls, a chassis disposed at a bottom of the frame, and four wheel assemblies disposed on two sides of the front wall and two sides of the back wall respectively, wherein the front wall comprises an n-shaped support, a lower horizontal tube and two sliding blocks, the lower horizontal tube is fixed to two symmetric ends of the n-shaped support, the sliding blocks are disposed along two vertical tubes of the n-shaped support and are able to slide upwards and downwards; the back wall is identical in structure with the front wall;

Each side wall comprises at least two X-shaped folding members which are hinged together, each X-shaped folding member comprises a first long tube and a second long tube which are riveted together, upper ends of the first long tubes on front and back sides of the side walls are riveted to tops of the vertical tubes of the n-shaped supports of the front wall and the back wall respectively, and the second long tubes on the front and back sides of the side walls are riveted to the sliding blocks of the front wall and the back wall respectively;

The chassis comprises two bottom frames which are symmetrically hinged together, and a front side and a back side of the chassis are riveted to the horizontal tube of the front wall and the horizontal tube of the back wall respectively.

Further, the two hinged X-shaped folding members are connected through a hinge member, and the hinge member comprises a left connector and a right connector which are symmetric in structure; and the left connector or the right connector comprises a rivet portion and an insert portion, the two rivet portions of the left connector and the right connector are riveted together, and the insert portions are inserted into the first long tubes or the second long tubes and are fixed.

Further, each said bottom frame comprises two chassis side tubes, a long horizontal tube, a short horizontal tube and a chassis longitudinal tube, the two chassis side tubes are symmetrically arranged left and right and are narrowed inwardly from front to back, and narrow sides of the two bottom frames are hinged together; and the long horizontal tube and the short horizontal tubes are parallelly disposed between the two chassis side tubes, the short horizontal tube is disposed on the narrow side, and two ends of the chassis longitudinal tube are fixed to the middle of the long horizontal tube and the middle of the short horizontal tube respectively.

Furthermore, a longitudinal tube slotted member with an opening facing downwards is disposed on each of narrow sides of the two chassis side tubes, rivet holes are formed in lower ends of the longitudinal tube slotted members, and rivets penetrate through the rivet holes to rivet the two longitudinal tube slotted members on left sides or right sides of the two bottom frames.

Furthermore, the chassis further comprises four U-shaped chassis fixing members, the chassis fixing members are fixed on left and right inner sides of the lower horizontal tubes, and wide sides of the chassis side tubes are inlaid and riveted in U-openings of the chassis fixing members.

Further, the cart capable of being horizontally folded without increasing the height further comprises a cloth cover disposed in the frame.

Further, the cart capable of being horizontally folded without increasing the height further comprises a draw bar assembly, wherein the draw bar assembly comprises a handle, a telescopic rod and a draw bar connector which are sequentially arranged from top to bottom, and the draw bar connector is rotatably connected to the lower horizontal tube of the front wall and is able to rotate close to or away from the front wall.

Furthermore, the draw bar assembly further comprises a tube sleeve and a U-shaped member, the tube sleeve is disposed around the middle of the lower horizontal tube of the front wall in a left-right direction; the U-shaped member is inlaid in the tube sleeve from an opening in a lower end of the tube sleeve, and two symmetric sides of the U-shaped member stretch out from a front end of the tube sleeve; and a lower end of the draw bar connector is riveted to the two symmetric sides of the U-shaped member, and an upper end of the draw bar connector is provided with a mounting hole allowing the telescopic rod to be inlaid therein.

Further, each wheel assembly comprises a wheel, a wheel carrier and a stationary shaft, the stationary shaft penetrates through an upper end of the wheel carrier to be inserted into one vertical tube from a lower end of the vertical tube, and a wheel is disposed at a lower end of the wheel carrier.

Furthermore, the stationary shaft comprises an axle, an axle sleeve and a buckle, a circular groove is formed in an upper end of the axle fixed to the wheel carrier, a lower end of the buckle is inlaid in the circular groove, and the axle sleeve is disposed around the axle; and when the axle together with the axle sleeve is inserted into the vertical tube from the lower end to be assembled, the upper end of the buckle penetrates through the axle sleeve and a through hole formed in a lower end of a tube wall of the vertical tube.

Furthermore, the stationary shaft on the front wall further comprises a bearing, a gasket and a shell, the axle sleeve, the gasket, the bearing and the shell are disposed around the axle from top to bottom, and a lower end of the axle sleeve is buckled on the shell.

Furthermore, a stop protrusion is formed in an outer wall of a lower end of the axle sleeve, a stop slot is upwardly formed in a lower surface of the vertical tube, and when the stationary shaft is inserted into the vertical tube to be assembled upwardly, the stop protrusion is clamped in the stop slot.

By adoption of the technical solution, the invention has the following beneficial effects: through the design of two or more X-shaped folding members, the side walls can be horizontally folded quickly; the sliding blocks can slide along the vertical tubes to allow the front wall and the back wall to be horizontally folded towards the middle directly, and the handle can be folded and turned to be attached to the front wall; the whole cart is simple in structure, can be folded more easily and quickly, has a small size after being folded, and occupies less space; compared with traditional unfoldable cart, the cart is more convenient to carry and transport and has a small size after being folded; the sliding blocks can drive the second long tubes to move downwards to be folded, and after being folded, the second long tubes are not higher than the vertical tubes, such that the height is not increased, and the cart can be placed in cars to be carried and used outdoors, and can be packaged in batches after being produced, so that package and transport costs are reduced; and the cart may be provided with the cloth cover which is fixed on the frame through multiple mounting sites, so the cloth cover is convenient and fast to detach, and the transport capacity of the cart is high.

Figure 1:
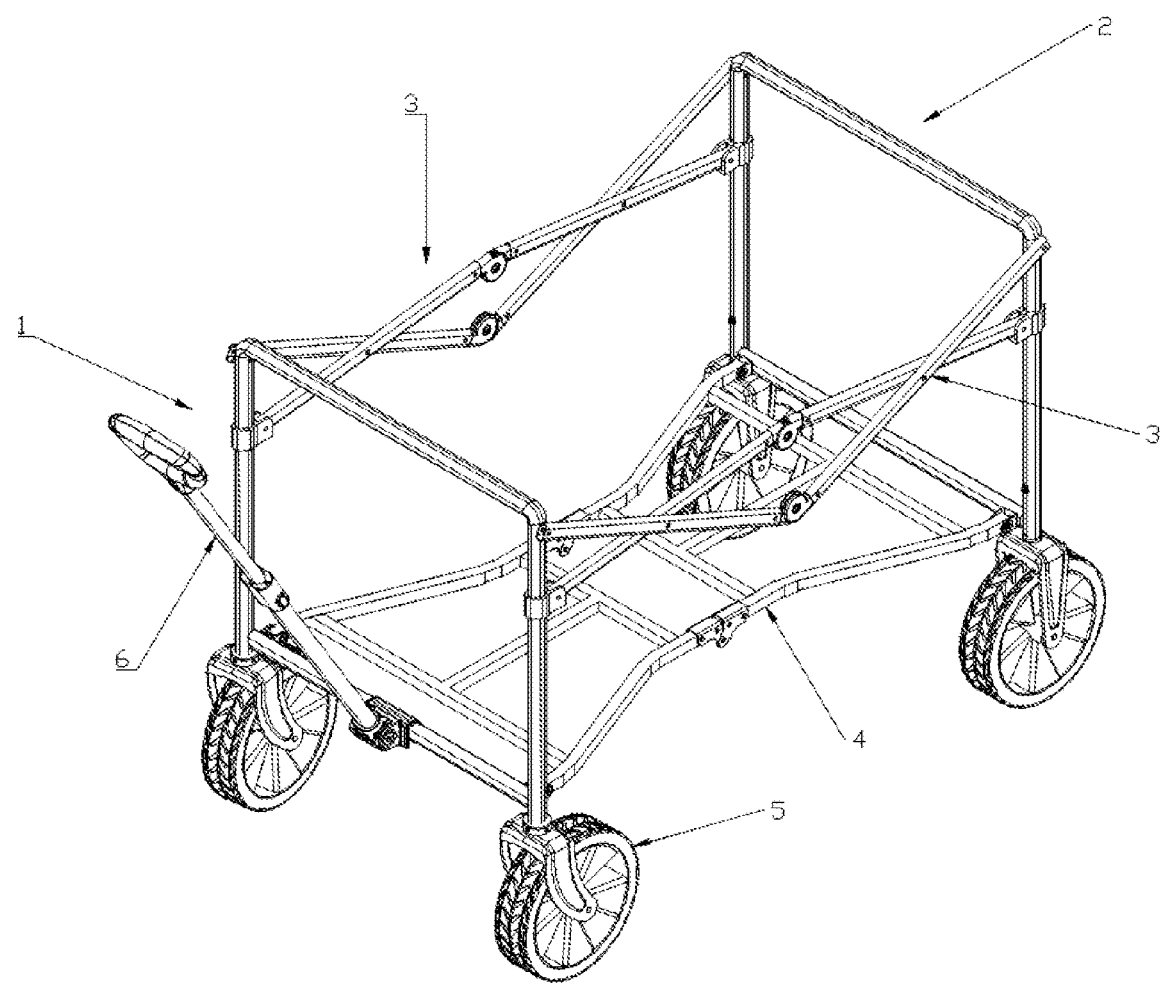
FIG. 1 is a three-dimensional view of a first cart capable of being horizontally folded.
Figure 2:
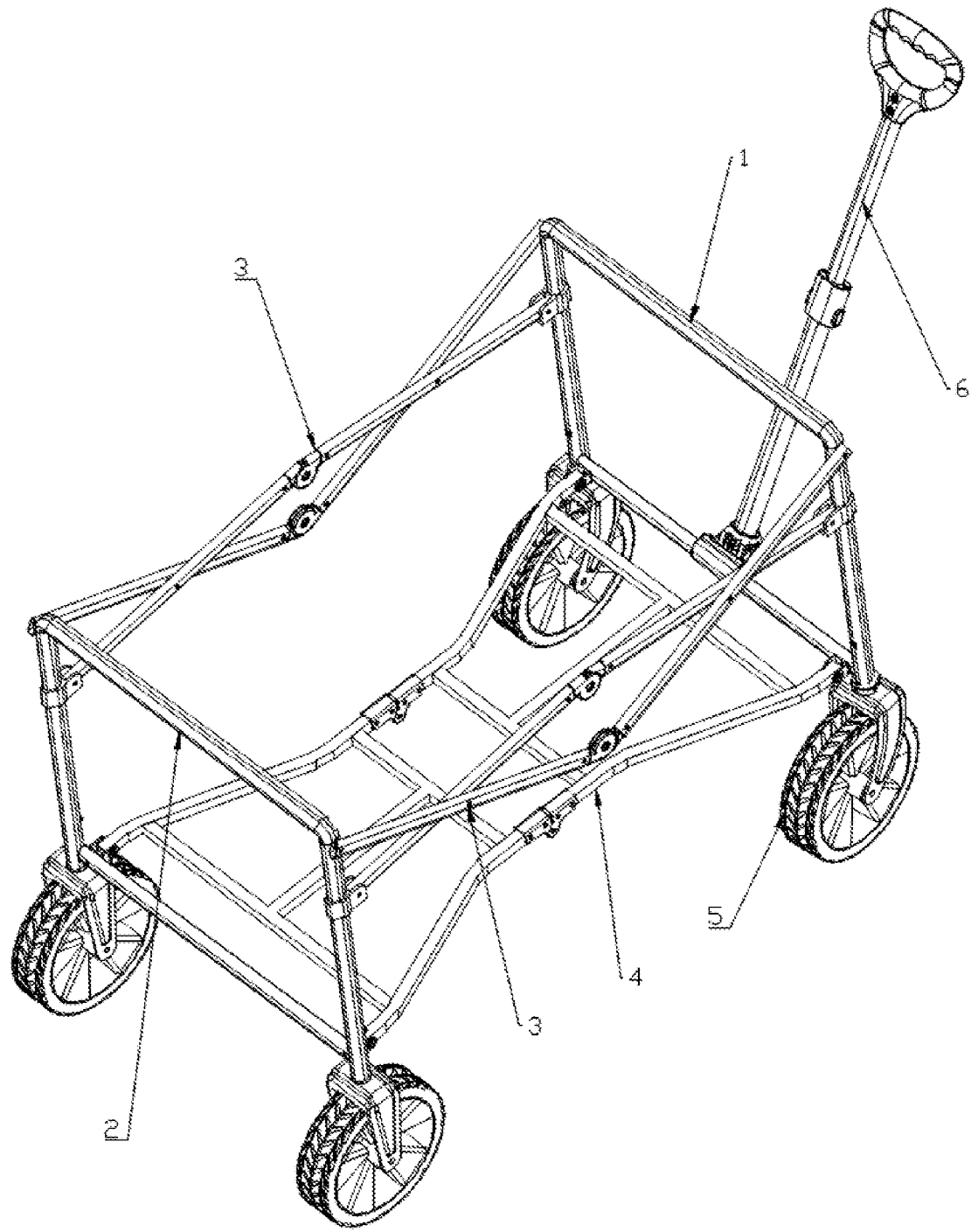
FIG. 2 is another three-dimensional view of the first cart capable of being horizontally folded.
Figure 3:
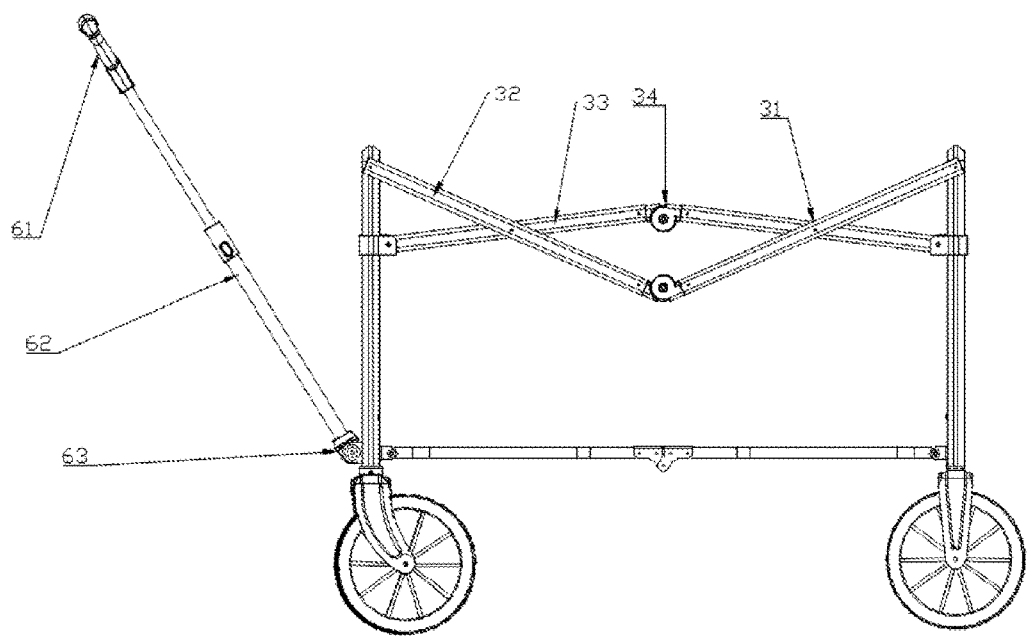
FIG. 3 is a side view of the first cart capable of being horizontally folded.

In the figures: 1, front wall; 11, n-shaped support; 11a, vertical tube; 11b, through hole; 11c, notch; 12, lower horizontal tube; 13, sliding block; 2, back wall; 3, side wall; 31, X-shaped folding member; 32, first long tube; 33, second long tube; 34, hinge member; 34a, left connector; 34a1, rivet portion; 34a2, insert portion; 34b, right connector; 4, chassis; 41, bottom frame; 41a, chassis side tube; 41b, long horizontal tube; 41c, short horizontal tube; 41d, chassis longitudinal tube; 42, longitudinal tube slotted member; 42a, rivet hole; 43, chassis fixing member; 5, wheel assembly; 51, wheel; 52, wheel carrier; 53, stationary shaft; 531, axle; 531a, circular groove; 532, axle sleeve; 532a, horizontal through hole; 532b, lug; 533, bearing; 534, gasket; 535, shell; 535a, hole; 536, buckle; 6, draw bar assembly; 61, handle; 62, telescopic rod; 63, draw bar connector; 63a, mounting hole; 64, tube sleeve; 64a, opening; 64b, strip-shaped slot; 65, U-shaped member; 7, cloth cover.

DETAILED DESCRIPTION OF THE INVENTION

To gain a better understanding of the technical solutions of the invention, the specific solutions and embodiments of the invention will be further expounded below in conjunction with the accompanying drawings.

As shown in FIG. 1-FIG. 7, this embodiment discloses a cart capable of being horizontally folded without increasing the height, which comprises a frame formed by a front wall 1, a back wall 2 and two symmetric side walls 3, a chassis 4 disposed at the bottom of the frame, and four wheel assemblies 5 which are disposed on two sides of the front wall 1 and two sides of the back wall 2 respectively.

The front wall 1 comprises an n-shaped support 11, a lower horizontal tube 12 and two sliding blocks 13, wherein the lower horizontal tube is fixed to two symmetric ends of the n-shaped support, and the sliding blocks 13 are disposed along two vertical tubes 11a of the n-shaped support and are able to slide upwards and downwards; and the back wall 2 is identical in structural with the front wall 1. The wheel assemblies 5 are installed at lower ends of the vertical tubes 11a.

In one embodiment, the sliding blocks 13 are directly disposed around the vertical tubes 11 and are able to slide upwards and downwards, the diameter of through holes formed in the sliding blocks 13 is greater than that of the vertical tubes 11, the sliding blocks 13 are disposed around the vertical tubes through the through holes and are able to slide upwards and downward freely.

In another embodiment, the vertical tubes 11 are provided with longitudinal sliding slots or sliding rails, and the sliding blocks 13 slide longitudinally along the sliding slots or the sliding rails. The length of the sliding slots or the sliding rails is designed to be less or equal to that of the vertical tubes.

Each side wall 3 comprises two X-shaped folding members 31 which are hinged together, as shown in FIG. 1-4. Each X-shaped folding member 31 comprises a first long tube 32 and a second long tube 33 which are riveted together, ends of the two first long tubes 32 of the two X-shaped folding members 31 are hinged together, and ends of the two second long tubes 33 of the two X-shaped folding members 31 are hinged together. Upper ends of the first long tubes 32 on front and back sides of the side walls 3 are riveted to tops of the vertical tubes 11a of the n-shaped supports of the front wall 1 and the back wall 2, and the second long tubes 33 on the front and back sides of the side walls 3 are riveted to the sliding blocks 13 of the front wall 1 and the back wall 2 respectively.

Because of each side wall 3 is formed by two X-shaped folding members which are hinged together, the length of the first long tubes 32 is different from that of the second long tubes 33, and specifically, the length of the first long tubes 32 is greater than that of the second long tubes 33.

The two hinged X-shaped folding members are connected through a hinge member 34, and the hinge member comprises a left connector 34a and a right connector 34b which are symmetric in structure; the left connector or the right connector comprises a rivet portion 34a1 and an insert portion 34a2, the rivet portions of the left connector and the right connector are riveted together, and the insert portions are inserted into the first long tubes or the second long tubes and are fixed with fasteners such as screws or pins.

In this embodiment, the chassis 4 comprises two bottom frames 41 which are symmetrically hinged together, and a front side and a back side of the chassis 4 are riveted to the lower horizontal tube 12 of the front wall 1 and the lower horizontal tube of the back wall 2 respectively.

Figure 9:
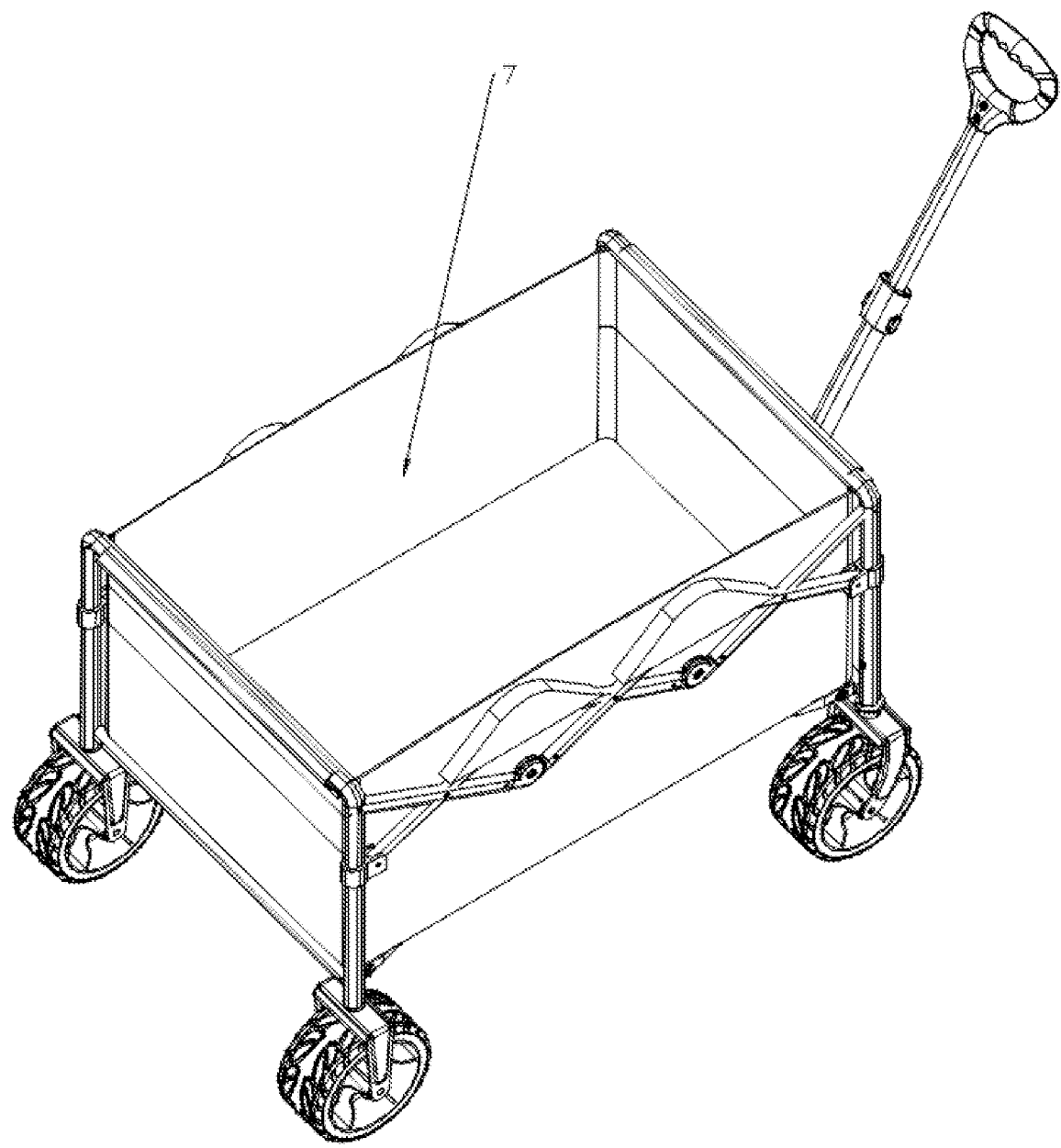
FIG. 9 is a three-dimensional view of a second cart capable of being horizontally folded.
Figure 10:
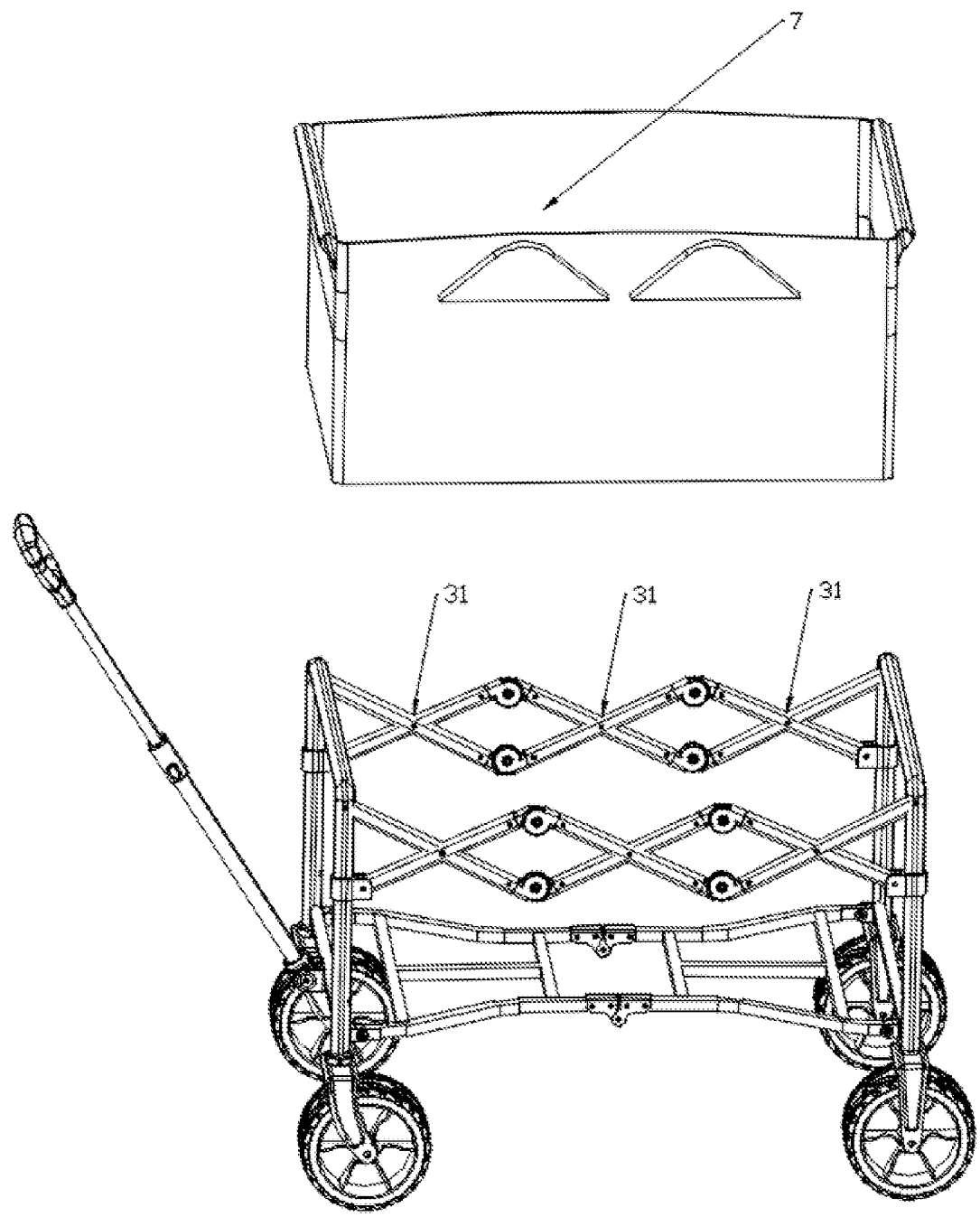
FIG. 10 is an exploded view of the second cart capable of being horizontally folded.

As required by the actual specification during use, each side wall 2 may comprise three X-shaped folding members 31 as shown in FIG. 9-FIG. 10, or more X-shaped folding members to make the carrying space large, such that the cart can transport more articles at a time.

In a specific embodiment, each bottom frame 41 comprises two chassis side tubes 41a, a long horizontal tube 41b, a short horizontal tube 41c and a chassis longitudinal tube 41d, wherein the two chassis side tubes 41a are symmetrically arranged left and right and are narrowed inwardly from front to back, and narrow sides of the two bottom frames 41 are hinged together; and the long horizontal tube 41b and the short horizontal tube 41c are parallelly disposed between the two chassis side tubes 41a, the short horizontal tube 41c is disposed on the narrow side, and two ends of the chassis longitudinal tube 41d are fixed to the middle of the long horizontal tube 41b and the middle of the short horizontal tube 41c respectively. All the tubes of the bottom frame 41 are fixed into a whole.

A longitudinal tube slotted member 42 with an opening facing downwards is disposed on each of two narrow sides of each chassis side tube 41a, the narrow sides are inlaid in the openings of the longitudinal tube slotted members 42 and are fixed with fasteners such as screws, rivet holes 42a are formed in lower ends of the longitudinal tube slotted members 42, and rivets penetrate through the rivet holes to rivet the two longitudinal tube slotted members 42 on left sides or right sides of the two bottom frames 41.

The chassis 4 further comprises four U-shaped chassis fixing members 43 and is connected to the front wall 1 and the back wall 2 through the U-shaped chassis fixing members 43. Two of the four chassis fixing members 43 are fixed to two ends, facing the center, of the two lower horizontal tubes 12 of the front wall 1 and the back wall 2 respectively, and wide sides of the chassis side tubes 41a are inlaid in U-openings of the chassis fixing members 43 to be riveted. The whole chassis 4 can be folded by lifting the longitudinal tube slotted members 42 to drive the narrow sides of the bottom frames 41 to rotate upwards so as to enable lower surfaces of the two bottom frames 41 to draw close to each other gradually.

When the whole cart is folded to be stored, the middle portions of the two bottom frames 41 move upwards to be folded, the first long tubes 32 and the second long tubes 33 are folded, and at the same time, the two n-shaped supports 11 connected to the side walls are folded towards the middle, such that the whole frame which is originally unfolded for use is folded, thus reducing the space occupied by the cart and facilitating batched packaging and transportation of the foldable cart.

In one specific embodiment, the cart further comprises a draw bar assembly 6 disposed on the front wall 1, wherein the draw bar assembly 6 comprises a handle 61, a telescopic rod 62 and a draw bar connector 63 which are sequentially arranged from top to bottom, and the draw bar connector 63 is rotatably connected to the lower horizontal tube 12 of the front wall 1 and is able to rotate close to or away from the front wall.

Figure 4:
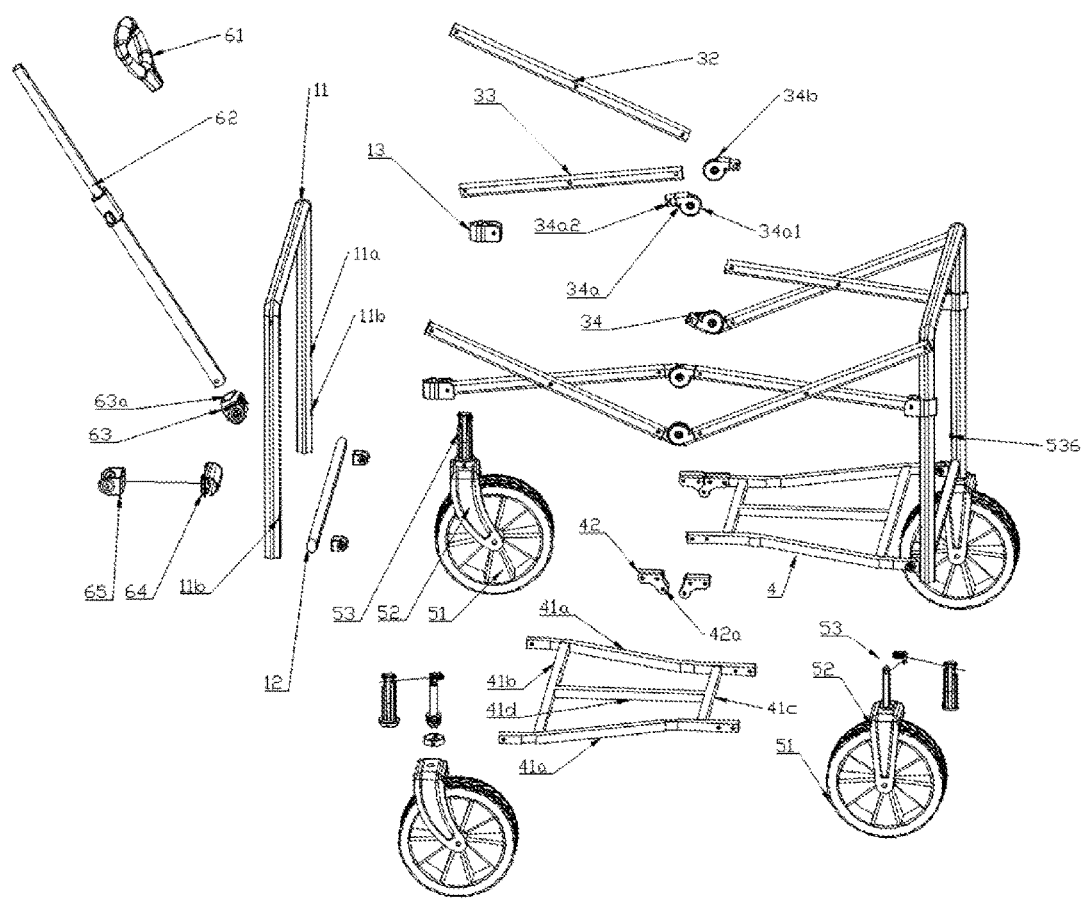
FIG. 4 is an exploded view of the first cart capable of being horizontally folded.
Figure 5:
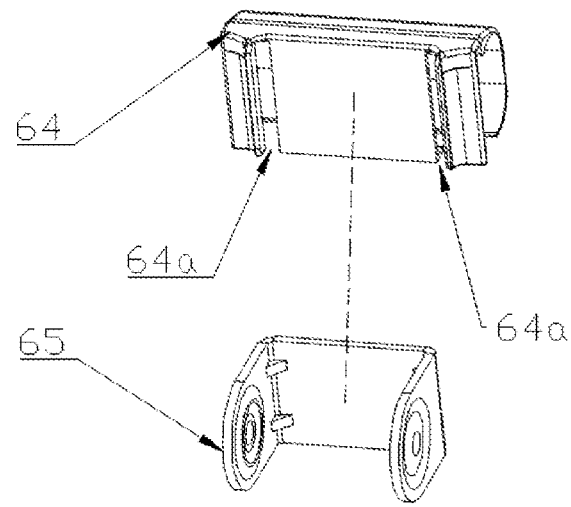
FIG. 5 is an exploded view of a tube sleeve and a U-shaped member.
Figure 6:
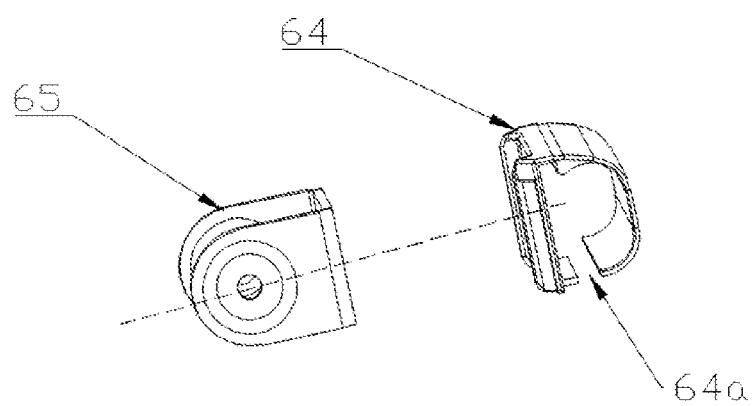
FIG. 6 is another exploded view of the tube sleeve and the U-shaped member.

The draw bar assembly 6 further comprises a tube sleeve 64 and a U-shaped member 65, as shown in FIG. 4-FIG. 6, the tube sleeve 64 is disposed around the middle of the lower horizontal tube 12 of the front wall 1 in a left-right direction, the U-shaped member 65 is inlaid into the tube sleeve 64 from an opening 64a in a lower end of the tube sleeve 64, and two symmetric sides of the U-shaped member 65 stretch out from strip-shaped slots 64b in a front end of the tube sleeve; and a lower end of the draw bar connector 63 is riveted to the two symmetric sides of the U-shaped member 65, and an upper end of the draw bar connector 63 is provided with a mounting hole 63a allowing the telescopic rod 62 to be inlaid therein.

The cart further comprises a cloth cover 7 disposed in the frame. Because the frame is composed of the bottom frames, X-shaped folding members, the n-shaped supports, and the like, gaps between the components are large, so large articles can be directly placed on the cart; however, small articles may fall out of the cart when the cart moves, so the detachable cloth cover 7 may be disposed on the frame to store small articles, and the cloth cover 7 can be detached to be cleaned after use.

As shown in FIG. 4-FIG. 6, each wheel assembly 5 is composed of a wheel 51, a wheel carrier 52 and a stationary shaft 53 which are sequentially arranged from bottom to top, wherein the stationary shaft 53 penetrates through an upper end of the wheel carrier 51 to be inserted into one vertical tube 11a from a lower end of the vertical tube 11a, and the wheel 51 is disposed at a lower end of the wheel carrier 52.

Figure 7:
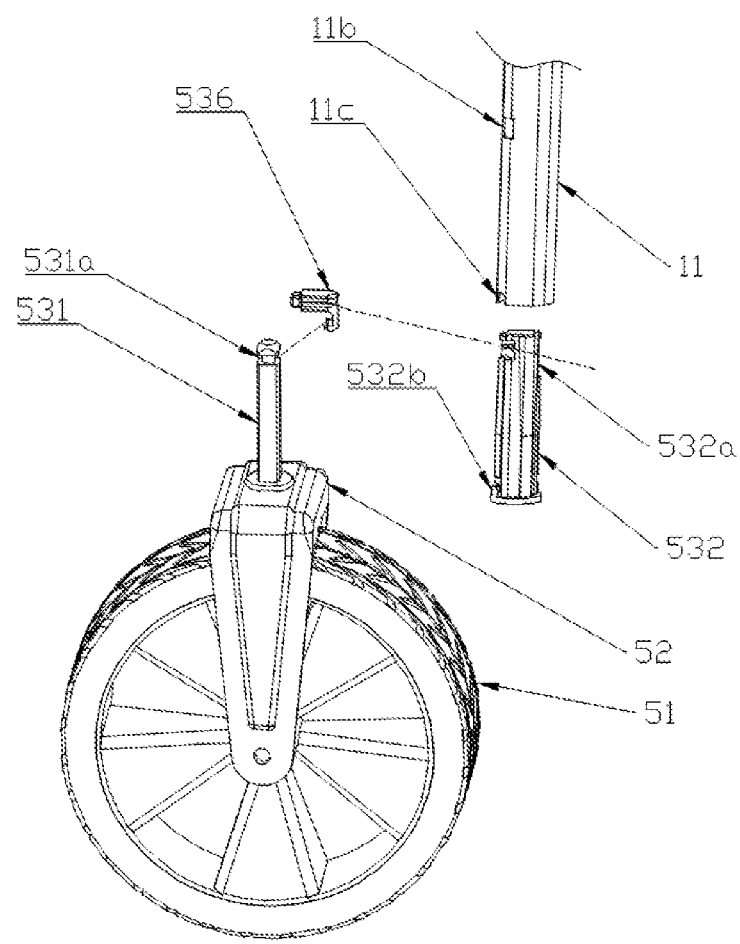
FIG. 7 is an exploded view of a wheel assembly on a front wall.

In one embodiment, the wheels on the back wall 1 are directional wheels, as shown in FIG. 7, the stationary shaft 53 of the directional wheels comprises an axle 531, an axle sleeve 532 and a buckle 536, a circular groove 531a is formed in an upper end of the axle 531 fixed to the wheel carrier 52, a lower end of the buckle 536 is inlaid in the circular groove 531a, the axle sleeve 532 is disposed around the axle 531; and when the axle 531 together with the axle sleeve 532 is inserted into the vertical tube 11a from the lower end to be assembled, an upper end of the buckle 536 penetrates through a horizontal through hole 532a formed in the axle sleeve 532 and a through hole 11b formed in a lower end of a tube wall of the vertical tube 11a.

Figure 8:
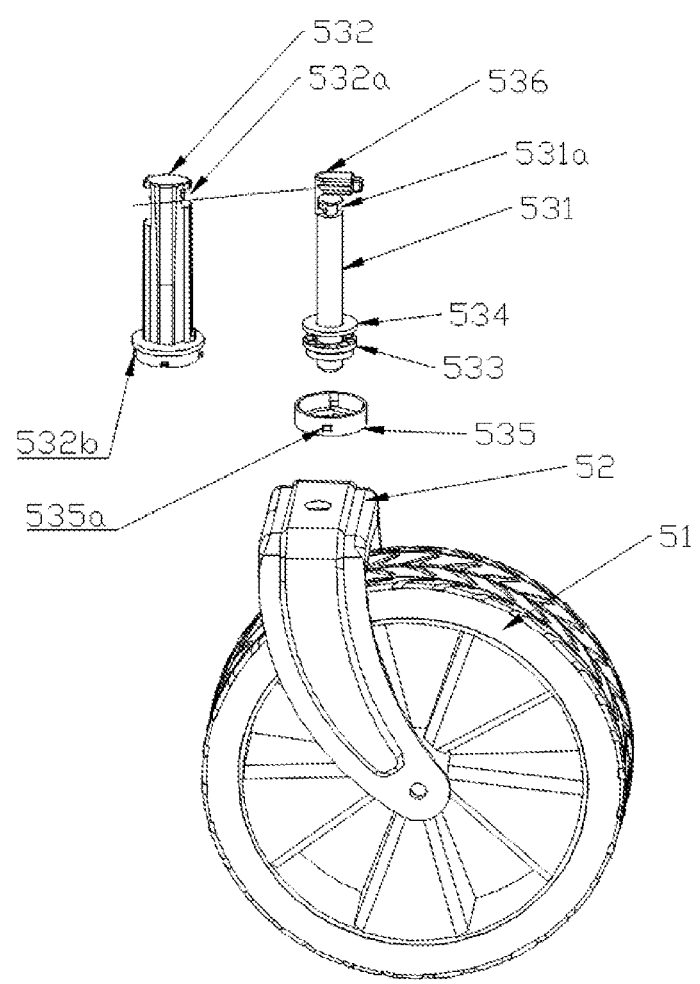
FIG. 8 is an exploded view of a wheel assembly on a back wall.

In another embodiment, the wheels on the front wall 1 are universal wheels, as show in FIG. 8, the stationary shaft 53 of the universal wheels not only comprises the axle 531, the axle sleeve 532 and the buckle 536, but also comprises a bearing 533, a gasket 534 and a shell 535, wherein the axle sleeve 532, the gasket 534, the bearing 533 and the shell 535 are disposed around the axle 531 from top to bottom, a plurality of lugs 532b on the periphery of a lower end of the axle sleeve 532 are clamped in multiple holes 535a in the periphery of the shell to cover the gasket 534 and the bearing 533; and when the stationary shaft 53 is inserted into the vertical tube from the lower end to be assembled, an upper end of the buckle penetrates through the axle sleeve 532 and a through hole 11b formed in a lower end of a tube wall of the vertical tube 11a.

In this embodiment, a stop protrusion 532b is disposed on an outer wall of a lower end of each axle sleeve 532, and a stop slot 11c is upwardly formed in a lower surface of each vertical tube 11, and when the stationary shafts 53 are inserted into the vertical tubes 11 to be assembled upwardly, the stop protrusions 532b are clamped in the stop slots 11c, such that transitional assembly is avoided.

It should be noted that the preferred embodiments and technical principle of the invention are described above. Those skilled in the art should understand that the invention is not limited to those specific embodiments described here, and can make various obvious changes, readjustments and substitutions without departing from the protection scope of the invention. So, although the invention has been described in detail with reference to the above embodiments, the invention is not limited to the these embodiments and may include more other equivalent embodiments without departing from the concept of the invention, and the scope of the invention should be defined by the scope of the appended claims.

What is claimed is:

1. A cart capable of being horizontally folded without increasing the height, the cart comprising:
    a frame composed of a front wall, a back wall and two symmetric side walls;
    a chassis disposed at a bottom of the frame; and
    four wheel assemblies disposed on two sides of the front wall and two sides of the back wall respectively;
    wherein the front wall comprises a support, a lower horizontal tube and two sliding blocks;
    wherein the lower horizontal tube is fixed to two symmetric ends of the support;
    wherein the sliding blocks are disposed along two vertical tubes of the support and are able to slide upwards and downwards;
    wherein the back wall is identical in structure with the front wall;
    each said side wall comprises at least two X-shaped folding members which are hinged together;
    each said X-shaped folding member comprises a first long tube and a second long tube which are riveted together;
    wherein upper ends of the first long tubes on front and back sides of the side walls are riveted to tops of the vertical tubes of the supports of the front wall and the back wall respectively;
    the second long tubes on the front and back sides of the side walls are riveted to the sliding blocks of the front wall and the back wall respectively;
    wherein the chassis comprises two bottom frames which are symmetrically hinged together, and a front side and a back side of the chassis are riveted to the horizontal tube of the front wall and the horizontal tube of the back wall respectively.

2. The cart capable of being horizontally folded without increasing the height according to claim 1, wherein the two hinged X-shaped folding members are connected through two hinge members, and the two hinge members each comprises a left connector and a right connector which are symmetric in structure; and the left connector and the right connector each comprises a rivet portion and an insert portion, the two rivet portions of the left connector and the right connector are riveted together, and the insert portions are inserted into the first long tubes and the second long tubes and are fixed.

3. The cart capable of being horizontally folded without increasing the height according to claim 1, wherein each said bottom frame comprises two chassis side tubes, a long horizontal tube, a short horizontal tube and a chassis longitudinal tube; the two chassis side tubes are symmetrically arranged left and right and are narrowed inwardly from front to back; and wherein narrow sides of the two bottom frames are hinged together; and the long horizontal tube and the short horizontal tubes are parallelly disposed between the two chassis side tubes; wherein the short horizontal tube is disposed on the narrow side, and two ends of the chassis longitudinal tube are fixed to a middle of the long horizontal tube and a middle of the short horizontal tube respectively.

4. The cart capable of being horizontally folded without increasing the height according to claim 3, wherein a longitudinal tube slotted member with an opening facing downwards is disposed on each of narrow sides of the two chassis side tubes; wherein rivet holes are formed in lower ends of the longitudinal tube slotted members, and rivets penetrate through the rivet holes to rivet the two longitudinal tube slotted members on left sides or right sides of the two bottom frames;
    or, the chassis further comprises four U-shaped chassis fixing members, the chassis fixing members are fixed on left and right inner sides of the lower horizontal tubes, and wide sides of the chassis side tubes are inlaid and riveted in U-openings of the chassis fixing members.

5. The cart capable of being horizontally folded without increasing the height according to claim 1, further comprising a cloth cover disposed in the frame.

6. The cart capable of being horizontally folded without increasing the height according to claim 1, further comprising a draw bar assembly, wherein the draw bar assembly comprises a handle, a telescopic rod and a draw bar connector which are sequentially arranged from top to bottom; and wherein the draw bar connector is rotatably connected to the lower horizontal tube of the front wall and is able to rotate close to or away from the front wall.

7. The cart capable of being horizontally folded without increasing the height according to claim 6, wherein the draw bar assembly further comprises a tube sleeve and a U-shaped member, the tube sleeve is disposed around a middle of the lower horizontal tube of the front wall in a left-right direction; the U-shaped member is inlaid in the tube sleeve from an opening in a lower end of the tube sleeve, and two symmetric sides of the U-shaped member stretch out from a front end of the tube sleeve; and a lower end of the draw bar connector is riveted to the two symmetric sides of the U-shaped member; and an upper end of the draw bar connector is provided with a mounting hole allowing the telescopic rod to be inlaid therein.

8. The cart capable of being horizontally folded without increasing the height according to claim 1, wherein each said wheel assembly comprises a wheel, a wheel carrier and a stationary shaft; the stationary shaft penetrates through an upper end of the wheel carrier to be inserted into one said vertical tube from a lower end of the vertical tube, and a wheel is disposed at a lower end of the wheel carrier.

9. The cart capable of being horizontally folded without increasing the height according to claim 8, wherein the stationary shaft comprises an axle, an axle sleeve and a buckle; wherein a circular groove is formed in an upper end of the axle fixed to the wheel carrier, a lower end of the buckle is inlaid in the circular groove, and the axle sleeve is disposed around the axle; and when the axle together with the axle sleeve is inserted into the vertical tube from the lower end to be assembled, the upper end of the buckle penetrates through the axle sleeve and a through hole formed in a lower end of a tube wall of the vertical tube.

10. The cart capable of being horizontally folded without increasing the height according to claim 9, wherein a stop protrusion is formed in an outer wall of a lower end of the axle sleeve, a stop slot is upwardly formed in a lower surface of the vertical tube; and when the stationary shaft is inserted into the vertical tube to be assembled upwardly, the stop protrusion is clamped in the stop slot;

or, the stationary shaft on the front wall further comprises a bearing, a gasket and a shell; wherein the axle sleeve, the gasket, the bearing and the shell are disposed around the axle from top to bottom, and a lower end of the axle sleeve is buckled on the shell.

* * * * *